(12) United States Patent  (10) Patent No.: US 7,734,109 B2
Baik et al.                (45) Date of Patent:     Jun. 8, 2010

(54) METHOD AND APPARATUS FOR BIT RESOLUTION EXTENSION

(75) Inventors: Aron Baik, Yongin-si (KR);
Chang-yeong Kim, Yongin-si (KR);
Seong-deok Lee, Suwon-si (KR);
Seung-sin Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 922 days.

(21) Appl. No.: 11/529,403

(22) Filed: Sep. 29, 2006

(65) Prior Publication Data

US 2007/0071348 A1    Mar. 29, 2007

(30) Foreign Application Priority Data

Sep. 29, 2005  (KR) ...................... 10-2005-0091357

(51) Int. Cl.
*G06K 9/40* (2006.01)
(52) U.S. Cl. .......................... 382/254; 382/299; 382/274
(58) Field of Classification Search .................. 382/299
See application file for complete search history.

(56) References Cited

U.S. PATENT DOCUMENTS 5,787,208 A    7/1998  Oh et al.

FOREIGN PATENT DOCUMENTS

| JP | 09-051421 A | 2/1997 |
| JP | 2002-057900 A | 2/2002 |
| KR | 10-2004-0088518 A | 10/2004 |
| KR | 10-2004-0094606 A | 11/2004 |

*Primary Examiner*—Samir A Ahmed
*Assistant Examiner*—Tsung-Yin Tsai
(74) *Attorney, Agent, or Firm*—Sughrue Mion, PLLC

(57) ABSTRACT

A bit resolution-extension method is provided. The bit resolution-extension method includes acquiring the shortest distance from a central pixel to a positive contour and the shortest distance from the central pixel to a negative contour in a filtering region which scans the positive contour comprising large pixels of a fixed value and the negative contour comprising small pixels of a fixed value, based on a value of the central pixel, generating an extension bit of the central pixel by interpolating the shortest distance from the central pixel to the positive contour and the shortest distance from the central pixel to the negative contour, and adding the extension bit as a lower bit of the central pixel.

16 Claims, 6 Drawing Sheets

DISTANCE LOOKUP TABLE

| 5 | 4 | 3 | 4 | 5 |
|---|---|---|---|---|
| 4 | 2 | 1 | 2 | 4 |
| 3 | 1 | X | 1 | 3 |
| 4 | 2 | 1 | 2 | 4 |
| 5 | 4 | 3 | 4 | 5 |

6: REGION OUTSIDE FILTER WINDOW

INTERPOLATION LOOKUP TABLE

| $d_N$ | $d_P$ | EXTENSION BIT |
|---|---|---|
| 1 | 1 | 0 0 0 |
| ... | | |
| 2 | 1 | 0 1 0 |
| 2 | 2 | 0 1 0 |
| 2 | 3 | 0 0 1 |
| ... | | |
| 6 | 5 | 1 0 0 |
| 6 | 6 | 0 1 1 |

FIG. 5A

DISTANCE LOOKUP TABLE

| 5 | 4 | 3 | 4 | 5 |
|---|---|---|---|---|
| 4 | 2 | 1 | 2 | 4 |
| 3 | 1 | X | 1 | 3 |
| 4 | 2 | 1 | 2 | 4 |
| 5 | 4 | 3 | 4 | 5 |

6: REGION OUTSIDE FILTER WINDOW

FIG. 5B

INTERPOLATION LOOKUP TABLE

| $d_N$ | $d_P$ | EXTENSION BIT |
|---|---|---|
| 1 | 1 | 0 0 0 |

...

| $d_N$ | $d_P$ | EXTENSION BIT |
|---|---|---|
| 2 | 1 | 0 1 0 |
| 2 | 2 | 0 1 0 |
| 2 | 3 | 0 0 1 |

...

| $d_N$ | $d_P$ | EXTENSION BIT |
|---|---|---|
| 6 | 5 | 1 0 0 |
| 6 | 6 | 0 1 1 |

4 BIT IMAGE

BIT RESOLUTION EXTENSION

8 BIT IMAGE

METHOD AND APPARATUS FOR BIT RESOLUTION EXTENSION

CROSS REFERENCE TO RELATED APPLICATION

This application claims priority from Korean Patent Application No. 10-2005-0091357 filed on Sep. 29, 2005 in the Korean Intellectual Property Office, the disclosure of which is incorporated herein by reference in its entirety.

BACKGROUND OF THE INVENTION

1. Field of the Invention

Methods and apparatuses consistent with the present invention relate to extending bit resolution. More particularly, the present invention relates to extending bit resolution by generating a lower extension bit of pixels by using a Euclidean distance to a contour composed of pixels having the same value.

2. Description of the Related Art

Generally, lower bits of pixel values are discarded in the quantization process of image processing. If a loss of lower bits occurs, the quality of an image is degraded or an artificial boundary of image components is generated.

As a result, many studies for extending bit resolution are in progress, but extending bit resolution is difficult to apply to small devices, such as mobile devices, because of the complexity of the algorithm.

SUMMARY OF THE INVENTION

An aspect of the present invention provides a method and an apparatus for extending bit resolution, which improves the resolution of an image and reduces quantization noise by extending bit resolution by generating an extension a low ranking bit by interpolating the shortest distance to a pixel having a different value in a surrounding area.

The present invention will not be limited to the technical aspects described above. Other aspects not described herein will be better understood by those skilled in the art from the following detailed description.

According to an exemplary embodiment of the present invention, there is provided a bit resolution-extension method including acquiring the shortest distance from a central pixel to a positive contour and the shortest distance from the central pixel to a negative contour in a filtering region that scans the positive contour comprising large pixels of a fixed value and the negative contour comprising small pixels of a fixed value, based on a value of the central pixel, generating an extension bit of the central pixel by interpolating the shortest distance from the central pixel to the positive contour and the shortest distance from the central pixel to the negative contour, and adding the extension bit as a lower bit of the central pixel.

According to an exemplary embodiment of the present invention, there is provided a bit resolution extension device, including a means of acquiring the shortest distance from a central pixel to a positive contour and the shortest distance from the central pixel to a negative contour in a filtering region that scans the positive contour comprising large pixels of a fixed value and the negative contour comprising small pixels of a fixed value, based on a value of the central pixel, a means of generating an extension bit of the central pixel by interpolating the shortest distance from the central pixel to the positive contour and the shortest distance from the central pixel to the negative contour, and a means of adding the extension bit as a lower bit of the central pixel.

According to another exemplary embodiment of the present invention, there is provided a bit resolution extension device, comprising a distance acquiring unit which acquires a shortest distance from a central pixel to a positive contour and a shortest distance from the central pixel to a negative contour in a filtering region which scans the positive contour comprising large pixels of a fixed value and the negative contour comprising small pixels of a fixed value based on a value of the central pixel; a generator which generates an extension bit of the central pixel by interpolating the shortest distance from the central pixel to the positive contour and the shortest distance from the central pixel to the negative contour; and an adder which adds the extension bit as a lower bit of the central pixel.

According to another exemplary embodiment of the present invention, there is provided an image processing device, comprising an input unit which receives an image signal; a preprocessing unit which receives the image signal from the input unit, and preprocesses the image signal; a contour-scanning unit which receives the preprocessed image signal, sets a filter window for each pixel of the image signal, scans a positive contour and a negative contour, calculates a shortest distance $d_P$ from a central pixel to the positive contour, and calculates a shortest distance $d_N$ from the central pixel to the negative contour; a contour interpolation unit which interpolates $d_P$ and $d_N$, and generates an extension bit value, and if the extension bit value is saved as a table using $d_P$ and $d_N$ as indexes, the contour interpolation unit reads the extension bit; and an extension-bit addition unit which adds the extension bit to a lower bit of the central pixel of the filter window.

BRIEF DESCRIPTION OF THE DRAWINGS

The above and other features of the present invention will become apparent by describing in detail exemplary embodiments thereof with reference to the attached drawings in which:

FIGS. 5A and 5B illustrate a lookup table used in the bit resolution-extension method according to an exemplary embodiment of the present invention.

DETAILED DESCRIPTION OF THE INVENTION

Figure 1:
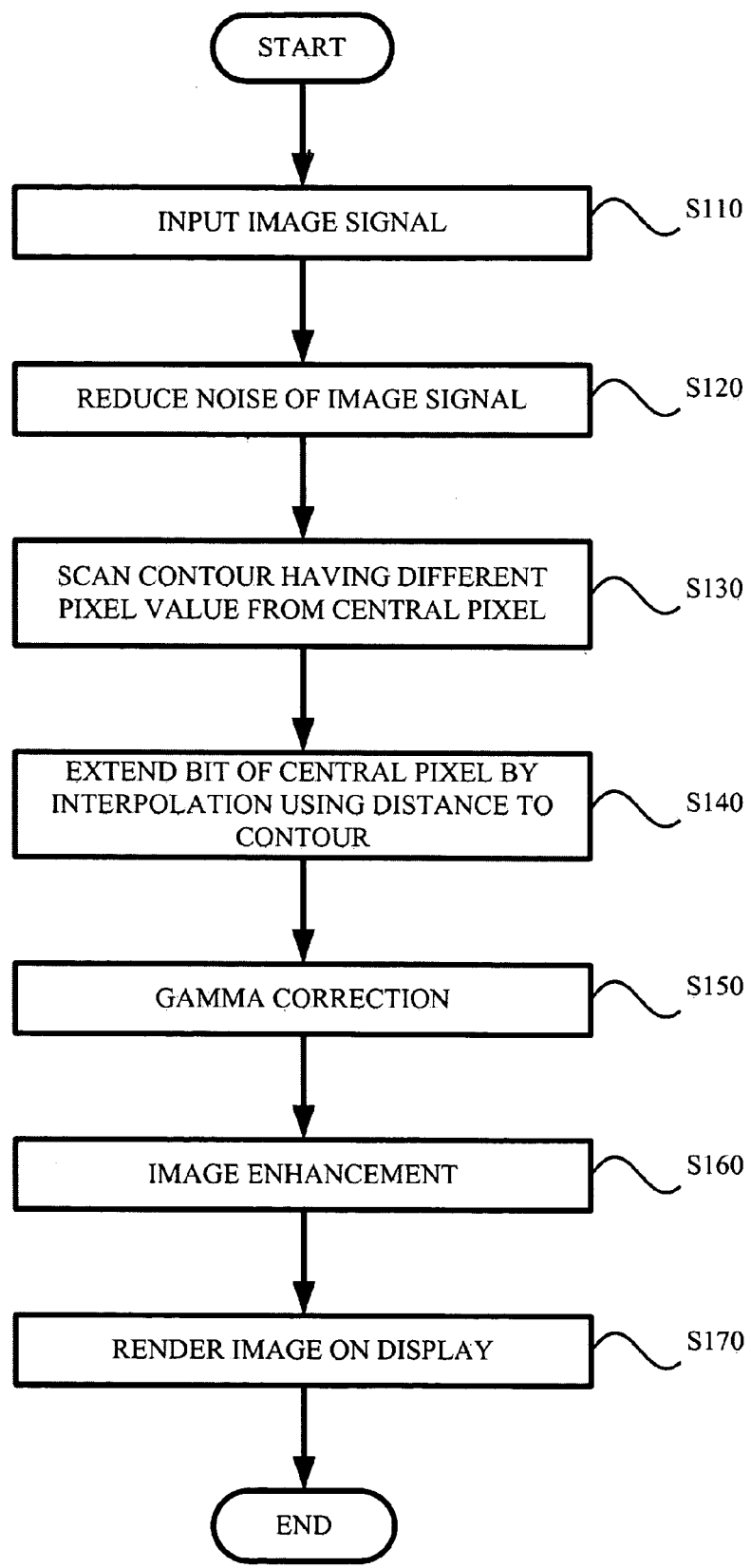
FIG. 1 is a flow chart illustrating an image processing process that uses a bit resolution-extension method according to an exemplary embodiment of the present invention.

Exemplary embodiments of the present invention will be described in detail with reference to the accompanying drawings.

Features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will be defined by the appended claims. Like reference numerals refer to like elements throughout the specification.

Hereinafter, exemplary embodiments of the present invention will be described in more detail with reference to the accompanying drawings. Each block and combinations of the blocks of the flow charts can be executed by computer program instructions. Because the computer program instructions can be executed in the processor of a general-purpose computer, special-purpose computer or other programmable data processing equipment, the instructions executed via the computers or other programmable data processing equipment generate a means for executing the functions explained in the flow chart blocks. Because it is possible for the computer program instructions to be saved in computer-usable or computer-readable memories, the instructions saved in the computer-usable or computer-readable memories can produce items containing instruction means for performing the functions explained in the flow chart blocks.

Also, each block can represent a part of a module, or a segment of code that includes one or more executable instructions for executing specific logical functions. Also, it should be noted that functions mentioned in the blocks can be executed in any order. For example, two sequential blocks can be executed at the same time, and the blocks can be executed in reverse order according to the concerned functions.

FIG. 1 is a flow chart illustrating an image processing process that uses a bit resolution-extension method according an exemplary embodiment of the present invention.

The image processing according to the exemplary embodiment starts when an image signal S110 is received, and preprocessing that reduces the noise in the inputted signal S120 is executed. For every pixel that has been preprocessed, when the pixel is set as a central pixel, a contour comprising pixels having a certain positive or negative difference with the central pixel value is scanned S130, and the bit of the central pixel is extended S140 by interpolating a distance from the central pixel to a positive contour and a negative contour. Image data, whose bit resolution is extended, is rendered in a display after postprocessing such as gamma correction S150, image enhancement S160, and others.

Figure 2:
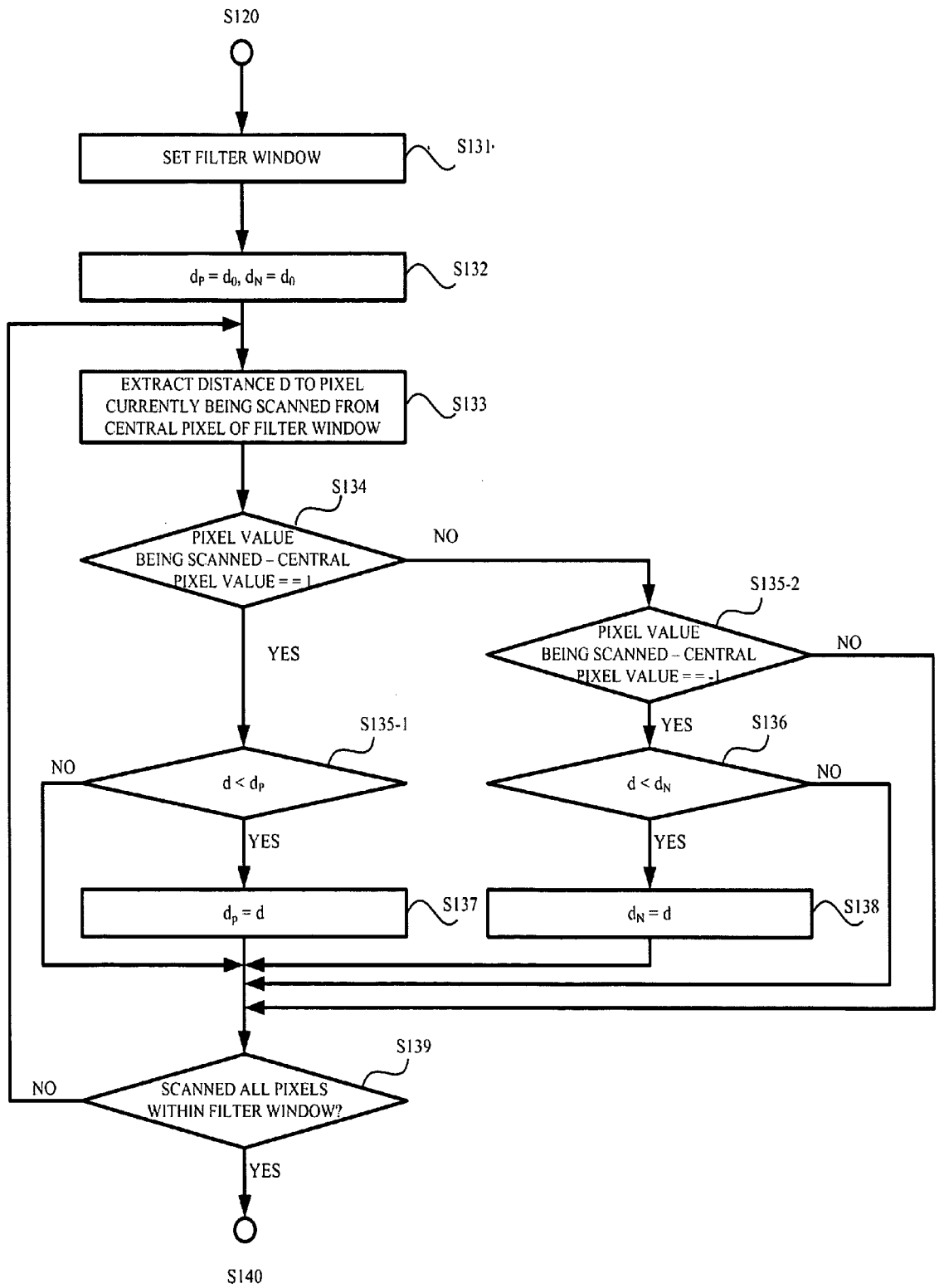
FIG. 2 is a flow chart illustrating a detailed process of a contour scanning step S130 in the image processing process described in FIG. 1.

FIG. 2 is a flow chart illustrating a detailed process of a contour scanning step S130 of the image processing process described in FIG. 1.

After preprocessing, a filter window, a region for scanning a positive contour and a negative contour on each pixel, is set S131. Here, the positive contour refers to a contour made by a region comprising pixels having a larger value than the central pixel value of the filter window, and the negative contour refers to a contour made by a region comprising pixels having a smaller value than the central pixel value of the filter window. In FIG. 2, the positive contour consists of pixels having a larger value than the central pixel value by 1, and the negative contour consists of pixels having a smaller value than the central pixel value by 1.

Before scanning the positive contour and the negative contour within the filter window, the shortest distance $d_P$ from the central pixel of the filter window to the positive contour and the shortest distance $d_N$ from the central pixel to the negative contour are set as a value $d_0$, which is the maximum value among distances from the central pixel to pixels within the filter window plus a constant S132.

A bit resolution extension device according to the exemplary embodiment extracts a distance d from the central pixel to a pixel currently being scanned while scanning every pixel within the filter window S133. The distance d from the central pixel to the pixel currently being scanned can be a Euclidean distance or a set of orders that satisfy the distance relation of each pixel within the filter window from the central pixel. If the distance d is calculated in the process of scanning or is saved in the form of a lookup table in advance, the distance d may correspond to a location of a pixel being scanned from the lookup table. An exemplary embodiment of a distance lookup table will be described later with reference to FIG. 5.

If a pixel value being scanned is larger than the central pixel value by 1 (YES in S134), it is considered that a positive contour has been found, and a distance d from the central pixel of a pixel currently being scanned and a distance $d_P$ from the currently-saved central pixel to the positive contour are compared S135-1. As a result of the comparison, if d is smaller than $d_P$ (YES in S135-2), $d_P$ is substituted by d S137. On the other hand, if a pixel value being scanned is smaller than the central pixel value by 1 (NO in S134 and YES in S135-2), it is considered that a negative contour has been found, and a distance d from the central pixel of a pixel currently being scanned and a distance $d_N$ from the currently-saved central pixel to the negative contour are compared S136. As a result of the comparison, if d is smaller than $d_N$ (YES in S136), $d_N$ is substituted for d S138.

By executing the above-described series of processes on every pixel within the filter window, the shortest distance $d_P$ to the positive contour of the central pixel of the filter window and the shortest distance $d_N$ to the negative contour of the central pixel are acquired.

In FIG. 2, the difference between the positive contour and the negative contour and the central pixel value is set as 1, but the present invention is not limited to this setting. The difference between the positive contour and the negative contour and the central pixel value can be any constant value, and if the difference gets larger, the range of the original bit value of the central pixel gets wider.

Figure 3:
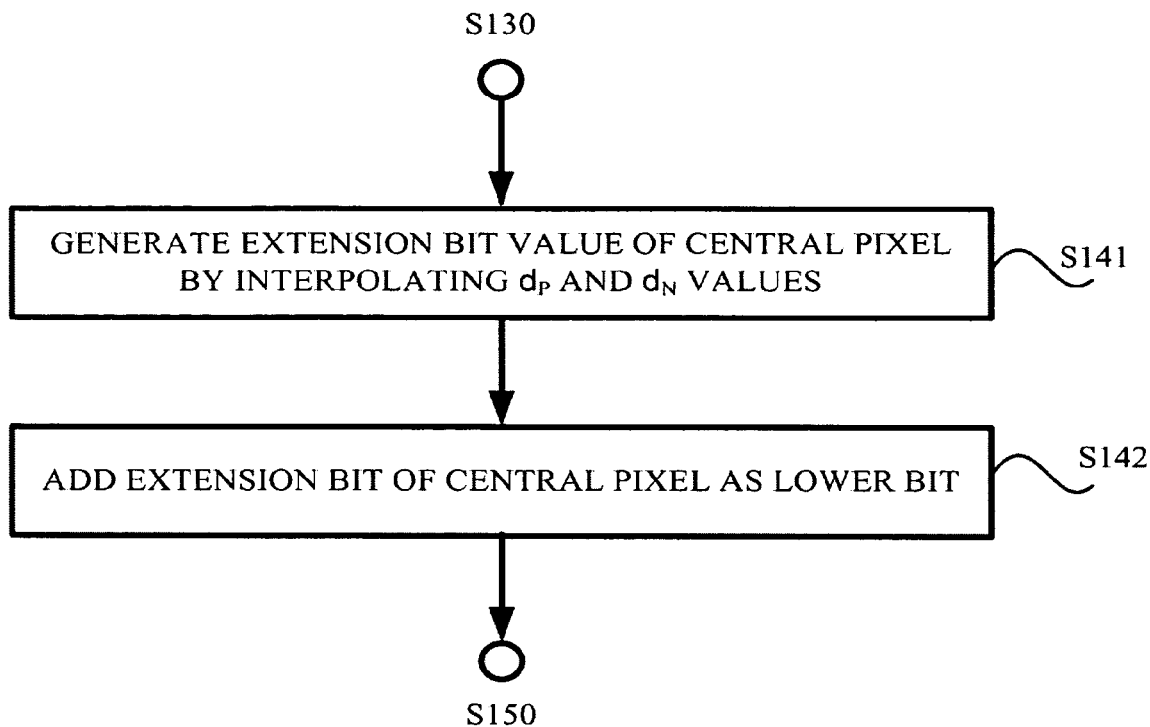
FIG. 3 is a flow chart illustrating a detailed process of a bit extension step S140 using interpolation in the image processing shown in FIG. 1.

FIG. 3 is a flow chart illustrating a detailed process of a bit extension step S140 using interpolation in the image processing process shown in FIG. 1.

If $d_P$ and $d_N$ values acquired in the contour-scanning step described in FIG. 2 are the shortest Euclidean distances from the central pixel to the positive contour and the negative contour, the bit resolution extension device according to the exemplary embodiment of the present invention calculates an extension bit value of the central pixel of the filter window by interpolating $d_P$ and $d_N$ values S141. An example of how to interpolate $d_P$ and $d_N$ values is expressed by the following equation.

$$\text{Extension Bit Value} = (d_N - 1)/(d_P + d_N - 1) \quad (1)$$

Here, $(d_N - 1)$ is used instead of $d_N$ so that the value of the extension bit becomes 0 in a rising edge of the negative contour.

A result interpolated by Equation 1 is applicable when the difference between the positive contour and the negative contour and the central pixel value is 1, and if the difference between the positive contour and the negative contour and the central pixel value is K (higher than 1), Equation 1 can be generalized by Equation 2:

$$\text{Extension Bit Value} = (d_N - K)/(d_P + d_N - K) \quad (2)$$

The bit resolution of the central pixel is extended by adding as a lower bit an extension bit value acquired by binary-coding a value generated by an interpolation of $d_P$ and $d_N$ in a central pixel bit S142.

In another exemplary embodiment, as illustrated in FIG. 5A, a relative location of the central pixel within the filter window is expressed as a set of orders, the set is saved, and a location value corresponding to each pixel scanning within the filter window can be read. In this case, $d_P$ and $d_N$ become the minimum value among location values of a pixel on the positive contour and the negative contour on the central pixel. At this time, $d_P$ and $d_N$ can be used as an index that searches an extension bit generated by interpolating a Euclidean distance from the central pixel to the positive contour in an interpolation lookup table of FIG. 5B. A detailed explanation of the distance lookup table and the interpolation lookup table is given later with reference to FIG. 5.

Figure 4:
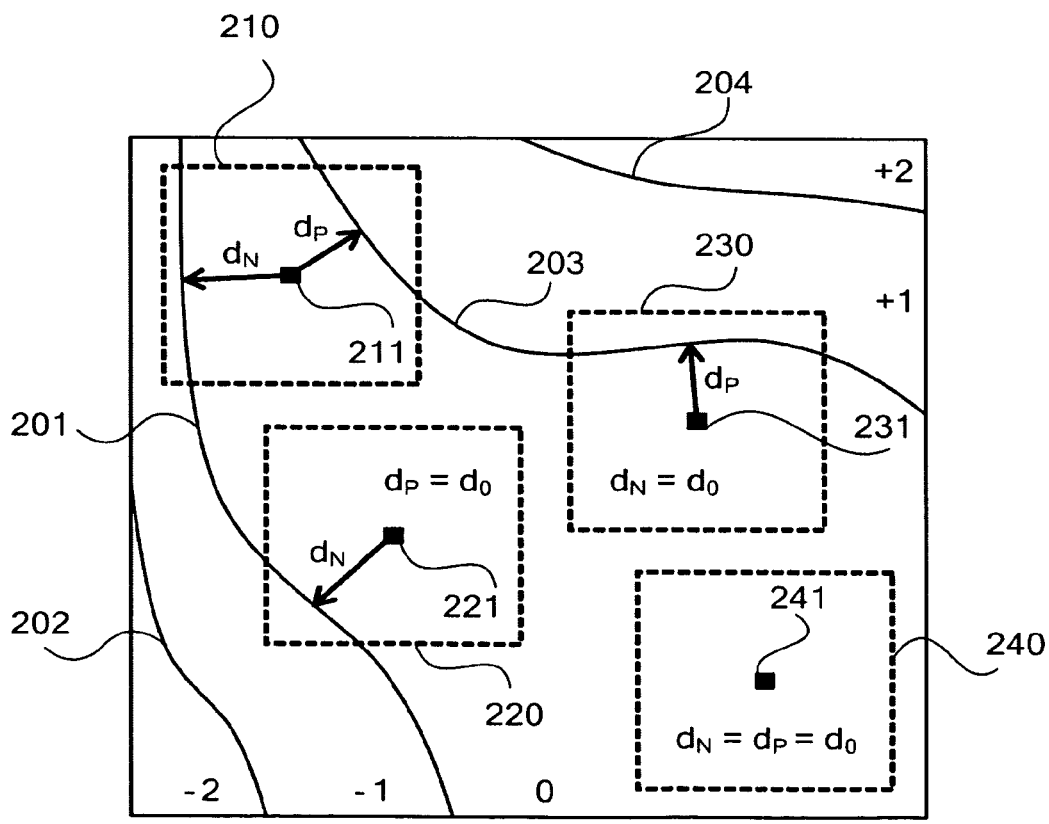
FIG. 4 illustrates a possible example of a contour scanning of the bit resolution-extension method according to an exemplary embodiment of the present invention.

FIG. 4 illustrates a possible example of a contour scanning for the bit resolution-extension method according to an exemplary embodiment of the present invention.

Numerals 201 through 204 represent contours generated by boundaries of pixel values; pixels in a region between contours 201 and 203 have the same value; pixels in a region between contours 203 and 204 have a value larger by 1 than the pixels in the region between contours 201 and 203; and pixels in a region between contours 201 and 202 have a value smaller by 1 than the pixels in the region between contours 201 and 203.

If a filter window for a central pixel 211 is set as in 210, contours 201 and 203 are included within the filter of the filter window 210. According to the process illustrated in the flow chart of FIG. 2, the contour 203 becomes a positive contour for a central pixel 211, and the contour 201 becomes a negative contour for the central pixel 211. A distance to a pixel that is closest to the central pixel 211 among pixels on the positive contour 203 is $d_P$, and a distance to a pixel that is closest to the central pixel 211 among pixels on the negative contour 201 is $d_N$.

When no negative contour but a positive contour exists within a filter window, the value $d_P$ can be set as a value $d_0$, which is the maximum distance among distances from a central pixel 221 to pixels within the filter window plus 1.

The same can be applied in case of a filter window 230 that only includes a positive contour. In other words, the value $d_N$ can be set as a value that is the maximum distance among distances from a central pixel 231 to pixels within the filter window plus 1.

Also, in the case of a filter window 240, because a positive contour and a negative contour are not all included within the window region, $d_N$ and $d_P$ all can be set to the maximum value among distances from a central pixel 241 to pixels within a filter window plus 1.

FIGS. 5A and 5B illustrate a lookup table used in the bit resolution-extension method according to an exemplary embodiment of the present invention.

A distance d from a central pixel of each filter window to every pixel being scanned within the filter window region is a Euclidean distance, and it is enough if the d is a value that can represent location relation from the central pixel. Therefore, the value d can be calculated while scanning the filter window, and as illustrated in FIG. 5A, the value d can be saved in the form of a table.

FIG. 5A is a table that expresses a 5×5 filter window as one set of orders according to a distance relation from the central pixel X. Relations are established where a pixel at the position denoted "2" is located farther away from the central pixel X than a pixel at the position denoted by "1", and where a pixel at the position denoted "3" is located farther away from the central pixel X than a pixel at the position denoted by "2". Therefore, a pixel denoted by "5" is a pixel located farthest away from the central pixel X within the filter window, and a region outside the filter window can have a value higher than "5", for example, "6".

An extension bit value of the central pixel binary-codes a value generated by interpolating a Euclidean distance from a central pixel to a positive contour and a negative contour. The extension bit value can be calculated from $d_P$ and $d_N$ during image processing or also can be saved in the form of a table using $d_N$ and $d_P$ values as an index as illustrated in FIG. 5B. In other words, from the central pixel, when $d_P=1$ and $d_N=1$, if the extension bit is made of 3 bits, the extension bit becomes 000.

As illustrated in FIGS. 5A and 5B, if a distance d and an extension bit value are calculated and saved in the form of a lookup table in advance, the bit resolution of pixels can be extended without increase of the calculated amount.

Figure 6:
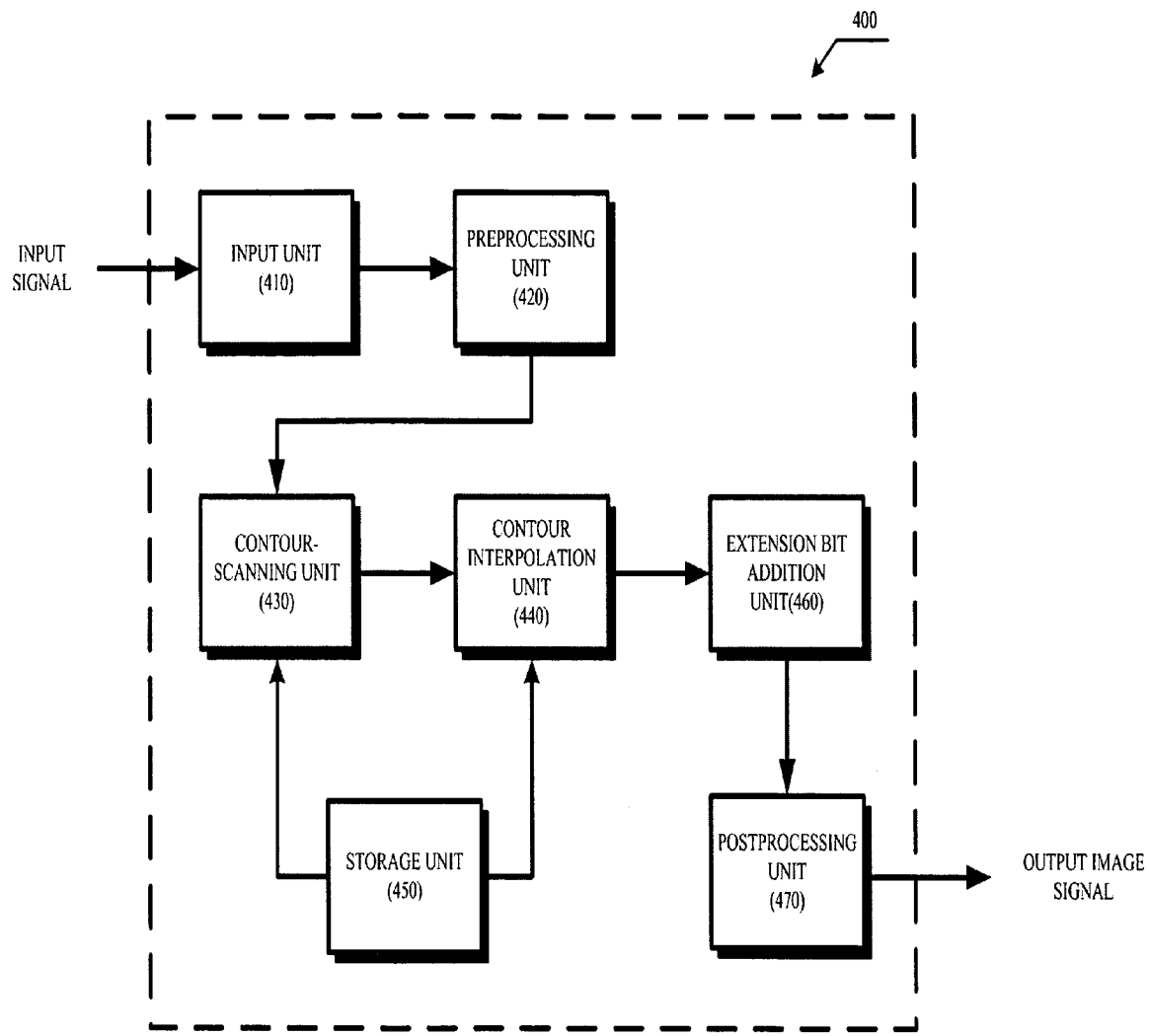
FIG. 6 is a block diagram illustrating the structure of an image processing device that includes a bit resolution extension device according to an exemplary embodiment of the present invention.

FIG. 6 is a block diagram illustrating the structure of an image processing device that includes a bit resolution extension device according to an exemplary embodiment of the present invention.

The image processing device 400 that includes a bit resolution extension device according to an exemplary embodiment of the present invention may include an input unit 410, a preprocessing unit 420, a contour-scanning unit 430, a contour interpolation unit 440, a storage unit 450, an extension-bit addition unit 460, and a postprocessing unit 470.

The input unit 410 receives an image signal and transmits the inputted signal to the preprocessing unit 420.

The preprocessing unit 420 executes preprocessing such as reducing the noise of the inputted image signal, and transmits the result of the process to the contour-scanning unit 430.

The contour-scanning unit 430 sets a filter window for each pixel of the image, scans a positive contour and a negative contour, and calculates the shortest distance $d_P$ from the central pixel to the positive contour, and the shortest distance $d_N$ from the central pixel to the negative contour. When calculating $d_P$ and $d_N$, if the distance from the central pixel to a pixel being scanned is saved in the form of a table in the storage unit as illustrated in FIG. 5A, the distance can be read from the storage unit 450.

The contour interpolation unit 440 interpolates $d_P$ and $d_N$ calculated in the contour-scanning unit 430, and generates an extension bit value. At this time, as illustrated in FIG. 5B, if an extension bit (an interpolated value) is saved as a table using $d_P$ and $d_N$ as indexes, the contour interpolation unit 440 reads an extension bit saved in the storage unit 450.

The extension bit addition unit 460 adds an extension bit transmitted by the contour interpolation unit 440 to a lower bit of the central pixel of the filter window.

The postprocessing unit 470 converts pixel values having extended bits to output image signals which can be rendered on a display through a postprocessing such as gamma correction, image enhancement, and others.

Each element in FIG. 6 can refer to a software element or a hardware element such as an FPGA or an ASIC. But the elements are not limited to software or hardware. The elements can reside in an addressable storage media or can reproduce one or more processors. The functions provided in the elements can be implemented by further-divided elements, or can be implemented to execute certain functions by combining elements. Furthermore, the elements can be implemented to execute one or more computers within a system.

Figure 7:
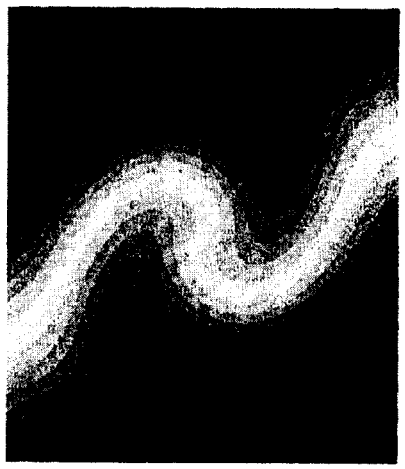
FIG. 7 illustrates an effect of applying the bit resolution-extension method according to an exemplary embodiment of the present invention to an image.
Figure 7:
Figure 7:
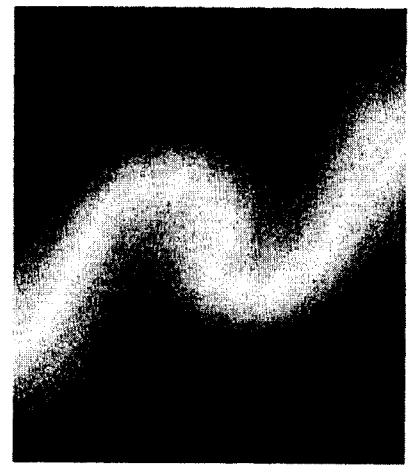

FIG. 7 illustrates an effect of applying the bit resolution-extension method according to an exemplary embodiment of the present invention to an image.

The left portion of FIG. 7 illustrates an image with a 4 bit resolution, and boundaries of curves are clearly shown. If the bit resolution is extended to 8 bits by applying a bit resolution-extension method according to an exemplary embodiment of the present invention, unnatural boundaries disappear and a natural image having details can be acquired as shown in the right portion of FIG. 7.

It will be understood by those of ordinary skill in the art that various replacements, modifications and changes may be made in the form and details without departing from the spirit and scope of the present invention as defined by the following claims. Therefore, it is to be appreciated that the above described exemplary embodiments are for purposes of illustration only and are not to be construed as limitations of the invention.

According to the bit resolution-extension method and device of the present invention described above, the resolution of an image is improved and noise is reduced by extending bit resolution by generating a low ranking extension bit by interpolating the shortest distance to a pixel having a different value in a surrounding area.

What is claimed is:

1. A bit resolution-extension method, the method comprising:
    acquiring a shortest distance from a central pixel to a positive contour and a shortest distance from the central pixel to a negative contour in a filtering region which scans the positive contour comprising large pixels of a fixed value and the negative contour comprising small pixels of a fixed value, based on a value of the central pixel;
    generating an extension bit of the central pixel by interpolating the shortest distance from the central pixel to the positive contour and the shortest distance from the central pixel to the negative contour; and
    adding the extension bit as a lower bit of the central pixel.

2. The method of claim 1, wherein the acquiring comprises:
    setting the shortest distance to the positive contour as a value larger than a maximum value among distances from the central pixel to pixels within the filtering region if the positive contour is not included within the filtering region; and
    setting the shortest distance to the negative contour as a value larger than the maximum value among distances from the central pixel to pixels within the filtering region if the negative contour is not included within the filtering region.

3. The method of claim 1, wherein the shortest distance to the positive contour is a minimum value among Euclidean distances from the central pixel to pixels constituting the positive contour, and the shortest distance to the negative contour is the minimum value among Euclidean distances from the central pixel to pixels making up the negative contour.

4. The method of claim 3, wherein the extension bit is a saved value, using a value which indicates a position of a pixel located closest to the central pixel among pixels on the positive contour, and a value which indicates a position of a pixel located closest to the central pixel among pixels on the negative contour as indexes.

5. The method of claim 1, wherein the extension bit is a saved value using a value which indicates a position of a pixel located closest to the central pixel among pixels on the positive contour, and a value which indicates a position of a pixel located closest to the central pixel among pixels on the negative contour as indexes.

6. The method of claim 1, wherein the generating comprises:
    interpolating the shortest distance to the positive contour and the shortest distance to the negative contour according to an equation: (shortest distance to the negative contour−a constant)/(shortest distance to the positive contour+the shortest distance to the negative contour−the constant value); and
    generating the extension bit by binary-coding the interpolated value.

7. The method of claim 6, wherein the constant is 1.

8. A bit resolution extension device comprising:
    a distance acquiring unit which acquires a shortest distance from a central pixel to a positive contour and a shortest distance from the central pixel to a negative contour in a filtering region which scans the positive contour comprising large pixels of a fixed value and the negative contour comprising small pixels of a fixed value based on a value of the central pixel;
    a generator which generates an extension bit of the central pixel by interpolating the shortest distance from the central pixel to the positive contour and the shortest distance from the central pixel to the negative contour; and
    an adder which adds the extension bit as a lower bit of the central pixel.

9. The device of claim 8, wherein the distance acquiring unit sets the shortest distance to the positive contour as a value larger than a maximum value among distances from the central pixel to pixels within the filtering region if the positive contour is not included within the filtering region, and sets the shortest distance to the negative contour as a value larger than the maximum value among distances from the central pixel to pixels within the filtering region if the negative contour is not included within the filtering region.

10. The device of claim 8, wherein the shortest distance to the positive contour is a minimum value among Euclidean distances from the central pixel to pixels constituting the positive contour, and the shortest distance to the negative contour is the minimum value among Euclidean distances from the central pixel to pixels making up the negative contour.

11. The device of claim 10, wherein the extension bit comprises a saved value, using a value which indicates a position of a pixel located closest to the central pixel among pixels on the positive contour, and a value which indicates a position of a pixel located closest to the central pixel among pixels on the negative contour as indexes.

12. The device of claim 8, further comprising:
    a storage unit which stores the extension bit, using a value which indicates a position of a pixel located closest to the central pixel among pixels on the positive contour, and a value which indicates a position of a pixel located closest to the central pixel among pixels on the negative contour as indexes.

13. The device of claim 8, wherein the generator comprises:
    a contour interpolation unit which interpolates the shortest distance to the positive contour and the shortest distance to the negative contour according to an equation (shortest distance to the negative contour−constant)/(shortest distance to the positive contour+the shortest distance to the negative contour−constant); and an extension generator which generates the extension bit by binary-coding the interpolated value.

14. The device of claim 13, wherein the constant is 1.

15. A computer readable medium having recorded thereon a computer program for executing a bit resolution-extension method, the method comprising:
   acquiring a shortest distance from a central pixel to a positive contour and a shortest distance from the central pixel to a negative contour in a filtering region which scans the positive contour comprising large pixels of a fixed value and the negative contour comprising small pixels of a fixed value, based on a value of the central pixel;
   generating an extension bit of the central pixel by interpolating the shortest distance from the central pixel to the positive contour and the shortest distance from the central pixel to the negative contour; and
   adding the extension bit as a lower bit of the central pixel.

16. A bit resolution extension device comprising:
   means for acquiring a shortest distance from a central pixel to a positive contour and a shortest distance from the central pixel to a negative contour in a filtering region which scans the positive contour comprising large pixels of a fixed value and the negative contour comprising small pixels of a fixed value based on a value of the central pixel;
   means for generating an extension bit of the central pixel by interpolating the shortest distance from the central pixel to the positive contour and the shortest distance from the central pixel to the negative contour; and
   means for adding the extension bit as a lower bit of the central pixel.

* * * * *